United States Patent
Hosaka et al.

(10) Patent No.: US 7,790,788 B2
(45) Date of Patent: Sep. 7, 2010

(54) METHOD FOR PRODUCING CHEMICAL MECHANICAL POLISHING PAD

(75) Inventors: Yukio Hosaka, Chuo-ku (JP); Rikimaru Kuwabara, Chuo-ku (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 12/253,349

(22) Filed: Oct. 17, 2008

(65) Prior Publication Data

US 2009/0104856 A1 Apr. 23, 2009

(51) Int. Cl.
*D21H 19/58* (2006.01)
*C08B 37/02* (2006.01)
*B24D 11/00* (2006.01)

(52) U.S. Cl. .............................. 524/52; 524/35; 524/47; 524/48; 524/40; 451/527; 451/528; 451/529; 451/538; 451/539; 451/530

(58) Field of Classification Search ................. 451/527, 451/528, 529, 538, 539, 530; 524/35, 47, 524/48, 40, 52
See application file for complete search history.

(56) References Cited

U.S. PATENT DOCUMENTS

| | | | |
|---|---|---|---|
| 3,832,326 A * | 8/1974 | North | 524/264 |
| 6,848,974 B2 * | 2/2005 | Hasegawa et al. | 451/41 |
| 6,992,123 B2 * | 1/2006 | Shiho et al. | 524/17 |
| 2004/0063391 A1 * | 4/2004 | Hosaka et al. | 451/526 |
| 2004/0203320 A1 | 10/2004 | Hosaka et al. | |

FOREIGN PATENT DOCUMENTS

| | | |
|---|---|---|
| JP | 8-500622 | 1/1996 |
| JP | 11-70463 | 3/1999 |
| JP | 2000-34416 | 2/2000 |
| JP | 2004-327974 | 11/2004 |
| WO | WO 94/04599 | 3/1994 |

* cited by examiner

*Primary Examiner*—Ling-Siu Choi
(74) *Attorney, Agent, or Firm*—Oblon, Spivak, McClelland, Maier & Neustadt, L.L.P.

(57) ABSTRACT

There is provided a method for producing a chemical mechanical polishing pad, the method comprising the steps of (1) producing a sheet-shaped polymer molded article and (2) irradiating the sheet-shaped polymer molded article with an electron beam within an irradiation dose of 10 to 400 kGy.

A chemical mechanical polishing pad produced by the above method has advantages that it is excellent in removal rate and scratches and in-plane uniformity on a polished surface and that it shows a stable removal rate even when polishing a number of objects to be polished successively.

13 Claims, 1 Drawing Sheet

METHOD FOR PRODUCING CHEMICAL MECHANICAL POLISHING PAD

BACKGROUND OF THE INVENTION (i) Field of the Invention

This invention relates to a method for producing a chemical mechanical polishing pad.

(ii) Description of the Related Art

In production of semiconductor devices or the like in recent years, chemical mechanical polishing (generally abbreviated as "CMP") is often used as a polishing method capable of forming a surface having excellent flatness. As for this chemical mechanical polishing, it is known that polishing results depend largely on the characteristics and properties of a chemical mechanical polishing pad to be used. The polishing results include, for example, a removal rate, and scratches and in-plane uniformity on a polished surface.

As the chemical mechanical polishing pad, a variety of polishing pads have been proposed.

For example, in Japanese Patent Application Laid-Open Nos. 8-500622 and 2000-34416, materials constituting chemical mechanical polishing pads are studied. Further, in Japanese Patent Application Laid-Open No. 11-70463, for example, design of grooves on a surface (polishing surface) of a pad is studied. These chemical mechanical polishing pads mainly comprise a cross-linked polymer and pores or water-soluble particles dispersed in the polymer. As the chemical mechanical polishing pads, a chemical mechanical polishing pad comprising a thermoplastic polyurethane resin as a cross-linked polymer and pores dispersed in the resin is disclosed in Japanese Patent Application Laid-Open No. 8-500622, and a chemical mechanical polishing pad comprising 1,2-polybutadiene as a cross-linked polymer and water-soluble particles dispersed in the polymer is disclosed in Japanese Patent Application Laid-Open No. 2004-327974, for example.

The above chemical mechanical polishing pad comprising a thermoplastic polyurethane resin and pores is generally produced by cutting a polishing pad of desired thickness and shape out of a foamed polyurethane block prepared in advance. Production of this foamed polyurethane block requires processing at a temperature of about 150° C. for 1 to 4 hours, for example, and a cutting process for shaping the block into the shape of the polishing pad is further required. Thus, productivity of the polishing pad is not high.

Meanwhile, the above chemical mechanical polishing pad comprising 1,2-polybutadiene and water-soluble particles dispersed in the polymer is an excellent polishing pad free of problems in polishing performance of the chemical mechanical polishing pad comprising a thermoplastic polyurethane resin and pores dispersed in the resin and can be produced by, for example, heating a raw material composition for the pad which comprises 1,2-polybutadiene, water-soluble particles and a peroxide in a mold to cross-link the 1,2-polybutadiene component with the peroxide. In this case, the heating treatment must be carried out at a temperature of 170 to 180° C. for 10 to 20 minutes per polishing pad. Thus, productivity of the polishing pad is also not so high. Further, in the case of the chemical mechanical polishing pad comprising 1,2-polybutadiene and water-soluble particles dispersed in the polymer, a phenomenon is seen that although it shows an excellent initial removal rate immediately after its production, the removal rate gradually decreases as it chemical-mechanical-polishes a number of objects to be polished successively. Further, it is pointed out that the removal rate of polishing pad of this type shows rather strong temperature dependency.

SUMMARY OF THE INVENTION

The present invention has been conceived in view of the above circumstances, and the object thereof is to provide a method for producing a chemical mechanical polishing pad, the method being capable of producing a chemical mechanical polishing pad which is excellent in removal rate and scratches and in-plane uniformity on a polished surface and which shows a stable removal rate even when polishing a number of objects to be polished successively, by a highly productive and simple method.

According to the present invention, the above object and advantages of the present invention are achieved by a method for producing a chemical mechanical polishing pad, comprising the steps of:

(1) producing a sheet-shaped polymer molded article, and (2) irradiating the sheet-shaped polymer molded article with an electron beam within an irradiation dose of 10 to 400 kGy.

Figure 1:
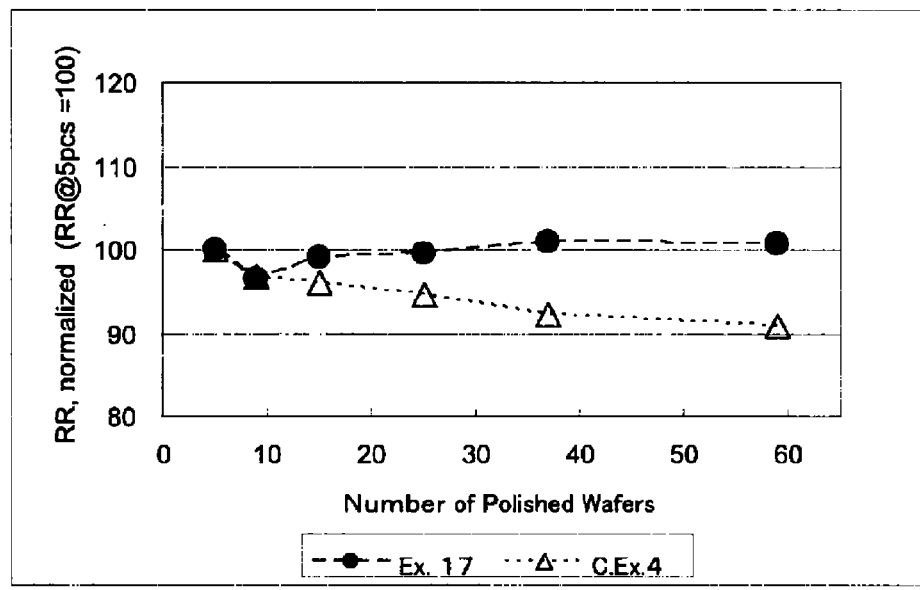
FIG. 1 is a diagram showing shifts of removal rates in successive polishing in Example 1 and Comparative Example 1.

DETAILED DESCRIPTION OF THE PREFERRED EMBODIMENTS (1) Step of Producing Sheet-Shaped Polymer Molded Article "Sheet-shaped" in a sheet-shaped polymer molded article indicates a shape with thickness within a range of 1.0 to 5.0 mm throughout the molded article, and its planar shape and sizes in dimensions other than the thickness can be set as appropriate according to a desired chemical mechanical polishing pad.

The sheet-shaped polymer molded article can be produced by, for example, preparing a raw material composition and molding the composition into a sheet shape by an appropriate method.

The above raw material composition for producing the sheet-shaped polymer molded article is such a raw material composition that the sheet-shaped polymer molded article shows a residual elongation after break measured after irradiation of electron beam of preferably not higher than 120%, more preferably 101 to 110%. This residual elongation after break refers to the proportion of the total length of broken pieces of a sample to the overall length of the dumbbell before a tensile test after the tensile test using the No. 3 dumbbell conforming to JIS K 6251 is conducted on the molded article after irradiation of electron beam.

The above raw material composition is preferably such a raw material composition that the ratio (E' (30)/E' (90)) of the storage elastic modulus at 30° C. (E' (30)) to the storage elastic modulus at 90° C. (E' (90)) of the molded article after irradiation of electron beam is 4 to 6. These storage elastic moduli are values obtained from a temperature dependency test of storage elastic modulus measured by use of "RSAIII" of TA Instruments in a tensile mode at a strain rate of 10 rad/s, a strain of 0.05% and a temperature increasing rate of 5° C./min.

The above raw material composition is such a raw material composition that the molded article shows a shore D hardness measured after irradiation of electron beam of preferably not lower than 30, more preferably 30 to 100, much more preferably 40 to 90, particularly preferably 40 to 75.

Further, a chemical mechanical polishing pad produced by the method of the present invention is preferably such that pores having such a function as retaining slurry and holding polish shavings temporarily at the time of chemical mechanical polishing are formed by the time of polishing. To this end, the chemical mechanical polishing pad is preferably formed from a material comprising a water-insoluble portion and water-soluble particles dispersed in the water-insoluble portion or a material (such as a foam) comprising a water-insoluble portion and pores dispersed in the water-insoluble portion. In the case of the former material, the water-soluble particles dissolve or swell and are detached by making contact with an aqueous medium contained in aqueous dispersion for chemical mechanical polishing at the time of polishing, and slurry can be held in pores formed by the detachment. Meanwhile, the latter material can hold slurry in pores formed in advance. Thus, the above raw material composition is preferably a composition comprising a water-insoluble material and water-soluble particles or a composition that is a precursor of a foam.

In the former composition, as the water-insoluble polymer material, an organic material is preferably used because it can be molded into a given shape easily and because it can impart a desired property such as moderate hardness or moderate elasticity easily. As the organic material, for example, a thermoplastic resin, elastomer, rubber, curable resin and the like can be used alone or in combination.

Illustrative examples of the above thermoplastic resin include 1,2-polybutadiene resins, polyolefin resins, polystyrene resins, polyacryl resins, vinyl ester resins (excluding those corresponding to polyacryl resins), polyester resins, polyamide resins, fluorine resins, polycarbonate resins, and polyacetal resins. Specific examples of the above polyolefin resins include polyethylene. Specific examples of the above polyacryl resins include (meth)acrylate resins. Specific examples of the above fluorine resins include polyvinylidene fluoride.

Illustrative examples of the above elastomer include a polyolefin elastomer (TPO), styrene elastomer, thermoplastic elastomer, silicone elastomer, and fluorine elastomer. Specific examples of the above styrene elastomer include a styrene-butadiene-styrene block copolymer (SBS) and a hydrogenated block copolymer (SEBS) thereof. Specific examples of the above thermoplastic elastomer include a thermoplastic polyurethane elastomer (TPU), thermoplastic polyester elastomer (TPEE), and polyamide elastomer (TPAE).

Illustrative examples of the above rubber include conjugated diene rubber, nitrile rubber, acrylic rubber, ethylene-α-olefin rubber, and other rubbers. Specific examples of the above conjugated diene rubber include butadiene rubber (e.g. high-cis butadiene rubber, low-cis butadiene rubber), isoprene rubber, styrene-butadiene rubber, and styrene-isoprene rubber. Specific examples of the above nitrile rubber include acrylonitrile-butadiene rubber. Specific examples of the above ethylene-α-olefin rubber include ethylene-propylene rubber, and ethylene-propylene-nonconjugated diene rubber. Specific examples of the above other rubbers include butyl rubber, silicone rubber, and fluorine-containing rubber.

Illustrative examples of a material constituting the water-soluble particles include organic water-soluble particles and inorganic water-soluble particles. Illustrative examples of the above organic water-soluble particles include particles comprising sugars (e.g. polysaccharides such as starch, dextrin and cyclodextrin, lactose, mannitol), celluloses (e.g. hydroxypropyl cellulose, methyl cellulose), protein, polyvinyl alcohol, polyvinyl pyrrolidone, polyacrylic acid, polyethylene oxide, a water-soluble photosensitive resin, sulfonated polyisoprene, a sulfonated isoprene copolymer, or the like. Illustrative examples of the above inorganic water-soluble particles include particles comprising potassium acetate, potassium nitrate, potassium carbonate, potassium bicarbonate, potassium chloride, potassium bromide, potassium phosphate, magnesium phosphate, or the like. These water-soluble particles can be used alone or in combination of two or more.

The above water-soluble particles are particularly preferably solid bodies so that a chemical mechanical polishing pad having a proper hardness value can be produced.

The average particle diameter of the water-soluble particles is preferably 0.1 to 500 μm, more preferably 0.5 to 100 μm. Accordingly, the size of the pores resulting from detachment of the water-soluble particles is preferably 0.1 to 500 μm, more preferably 0.5 to 100 μm. With the average particle diameter of the water-soluble particles within the above range, a chemical mechanical polishing pad showing a high removal rate and having excellent mechanical strength can be obtained.

The water-soluble particles are preferably such that they dissolve or swell in water or the like only when exposed to the surface layer in the polishing pad and they do not absorb moisture and do not swell inside the polishing pad. To this end, the water-soluble particles may have an outer shell that inhibits moisture absorption at least in a portion of the outermost part. This outer shell may be physically adsorbed to the water-soluble particles or chemically bonded to the water-soluble particles or may contact the water-soluble particles by both physical adsorption and chemical bonding. Illustrative examples of a material that forms such an outer shell include an epoxy resin, polyimide, polyamide, polysilicate, and silane coupling agent. In this case, the water-soluble particles may comprise water-soluble particles having an outer shell and water-soluble particles having no outer shell, and even if the water-soluble particles having an outer shell do not have the entire surface covered with the outer shell, the above effect can be attained to a sufficient extent.

The proportion of the water-soluble particles used in the above former raw material composition is preferably 1 to 90 vol % when the total of the water-insoluble polymer material and the water-soluble particles is 100 vol %.

By using the water-soluble particles in the above proportion, it is secured that the molded article after irradiation of electron beam has the above preferred residual elongation after break, ratio (E' (30)/E' (90)) of storage elastic modulus at 30° C. to storage elastic modulus at 90° C. and shore D hardness, and therefore a chemical mechanical polishing pad produced from the raw material composition is excellent in removal rate and scratches and in-plane uniformity on a polished surface and excellent in stability of the removal rate.

Meanwhile, illustrative examples of a water-insoluble member that constitutes a chemical mechanical polishing pad comprising the latter material comprising a water-insoluble portion and pores dispersed in the water-insoluble portion include a polyurethane, melamine resin, polyester, polysulfone, and polyvinyl acetate. Thus, the raw material composition is preferably a composition comprising a precursor that derives these by irradiation of electron beam.

When the chemical mechanical polishing pad of the present invention comprises the latter material, the average size of the pores dispersed in the water-insoluble portion is preferably 0.1 to 500 μm, more preferably 0.5 to 100 μm. The content of the pores is preferably 1 to 50 vol %, more preferably 1 to 20 vol %, particularly preferably 5 to 20 vol %. When the content of the pores is too high, hardness may become unsatisfactory. Meanwhile, when the content of the pores is too low, functions that the pores should have may not be fulfilled.

The raw material composition can be obtained by, for example, kneading a mixture of given materials by use of a kneading machine or the like. As the kneading machine, a conventionally known one can be used. Illustrative examples thereof include kneading machines such as a roll, kneader, Banbury mixer and extruder (single-screw, multi-screw). The kneading temperature is preferably not higher than 250° C., more preferably 50 to 200° C., much more preferably 70 to 150° C. The kneading time is preferably 2 to 10 minutes, more preferably 4 to 10 minutes. By preparing the raw material composition under such conditions, the raw material composition can be mixed uniformly without decomposition of the organic material contained in the raw material composition, and therefore a chemical mechanical polishing pad having excellent homogeneity and mechanical properties is produced. As a result, the polishing pad has an advantage of being excellent in in-plane uniformity on a polished surface when used in chemical mechanical polishing.

Further, when the raw material composition comprises a water-insoluble polymer material and water-soluble particles dispersed in the material, the water-soluble particles are preferably solid at the kneading temperature. That is, when water-soluble particles classified into the above preferred average particle diameter range in advance are used and the water-soluble particles and the water-insoluble polymer material are kneaded under a condition where the water-soluble particles are solid, the water-soluble particles can be dispersed with the above preferred average particle diameter regardless of the degree of compatibility between the water-soluble particles and the water-insoluble portion. Accordingly, it is preferable to select the kind of the water-soluble particles according to the processing temperature of the water-insoluble polymer material used.

The thus obtained raw material composition can be molded into a sheet by, for example, a method comprising plasticizing the raw material composition by an appropriate method such as a compression molding method, injection molding method, injection compression molding method or T-die extrusion method first and then cooling and solidifying the composition in a mold, preferably a metallic mold, having a cavity that matches a desired sheet shape.

To plasticize the raw material composition, heating is carried out. The heating temperature is preferably not higher than 250° C., more preferably 80 to 250° C., much more preferably 90 to 230° C., particularly preferably 95 to 200° C., most preferably 100 to 170° C. Time required for the plasticization is preferably not more than 5 minutes, more preferably 0.5 to 3 minutes, much more preferably 0.5 to 2 minutes. When the plasticization temperature is lower than 80° C. or the plasticization time is less than 0.5 minutes, the shape may become unstable due to insufficient plasticization disadvantageously, while when the plasticization temperature is higher than 250° C. or the plasticization time is more than 5 minutes, molecular degradation of the polymer material progresses, and degradation in the strength of the chemical mechanical polishing pad to be produced may occur disadvantageously.

When the molded article is cooled and solidified in the mold, it is preferably cooled to preferably 10 to 80° C., more preferably 20 to 70° C., much more preferably 30 to 60° C., particularly preferably 40 to 50° C. When the temperature of the molded article is lower than 10° C., the cooling rate is liable to become nonuniform, and therefore in-plane thickness distribution may become large disadvantageously. Meanwhile, when the molded article is taken out of the mold at a temperature exceeding 80° C., cooling of the molded article is not sufficient, so that the molded article may have unintended deformation such as warpage or undulation disadvantageously.

The sheet-shaped polymer molded article obtained as described above may be subjected to the subsequent electron beam irradiation step after its thickness is adjusted. This thickness adjustment can be made by use of a wide belt sander or the like, for example.

Throughout the above step of producing the sheet-shaped polymer molded article, the maximum achievable temperature preferably does not exceed 250° C. This maximum achievable temperature is more preferably 80 to 250° C., much more preferably 90 to 230° C. Further, time during which the raw material composition is exposed to such a maximum achievable temperature is preferably merely not more than 3 minutes, more preferably merely 0.2 to 2 minutes, much more preferably merely 0.2 to 1 minute, in the above step of plasticizing the raw material composition. In the method of the present invention for producing a chemical mechanical polishing pad, unlike a conventional production method involving thermal cross-linking, the time during which the raw material composition is exposed to the maximum achievable temperature is very short, so that the composition hardly undergoes molecular degradation or the like and does not undergo degradation in physical properties, and therefore the chemical mechanical polishing pad to be produced has an advantage that it has high toughness and is hardly worn away.

(2) Step of Irradiating the Sheet-Shaped Polymer Molded Article with Electron Beam within Irradiation Dose of 10 to 400 kGy The chemical mechanical polishing pad of the present invention is produced by irradiating the above sheet-shaped polymer molded article with an electron beam. In the step of irradiating the sheet-shaped polymer molded article with an electron beam, the irradiation dose of the electron beam is 10 to 400 kGy (Gy: Gray, J/kg). The irradiation dose is more preferably 25 to 300 kGy, much more preferably 50 to 200 kGy, most preferably 75 to 150 kGy. When the irradiation dose of the electron beam is lower than 10 kGy, generation of radicals by the electron beam is not sufficient, so that the degree of cross-linking is insufficient disadvantageously, while when the irradiation dose is higher than 400 kGy, degradation in mechanical property due to molecular degradation occurs disadvantageously.

The electron beam may be irradiated only once in a predetermined irradiation dose or may be irradiated in divided doses. When the electron beam is irradiated in divided doses, the divided doses may be equal irradiation doses or different irradiation doses, as long as the total irradiation dose is the above irradiation dose.

The accelerating voltage of the electron beam to be irradiated is preferably set appropriately according to the electron beam transmission of the above sheet-shaped polymer molded article. It is known that the degree of transmission of electron beam depends on the thickness of object to be irradiated and the kinetic energy of the electron beam. Therefore, strength distribution in the thickness direction of the polymer molded article can be controlled by setting the accelerating voltage of the electron beam appropriately according to the thickness of the polymer molded article. For example, when the accelerating voltage is set such that the electron beam is uniformly transmittable in the thickness direction of the polymer molded article, the polymer molded article can have a uniform degree of cross-linking in the thickness direction. Meanwhile, when the accelerating voltage is set such that the electron beam transmits nonuniformly in the thickness direction, the polymer molded article can have cross-link distribution in the thickness direction.

In the step of irradiating the molded article with an electron beam in the present invention, the relative irradiation dose at a position that is a half of the thickness of the polymer molded article is preferably not lower than 30%, more preferably not lower than 50%, based on the irradiation dose at the irradiated surface of the polymer molded article. When this relative irradiation dose is lower than 30%, the electron beam does not penetrate in the thickness direction of the polymer molded article to a sufficient extent, so that a satisfactory electron beam irradiation effect may not be attained.

As for irradiation of electron beam, it is known that depth to which the electron beam reaches changes according to the accelerating voltage of the electron beam and the density of object to be irradiated. For example, when the specific gravity of the polymer molded article is 1, preferred accelerating voltages of the electron beam are as shown in the following table 1.

TABLE 1

| Thickness of Polymer Molded Article | Preferred Accelerating Voltage | More Preferred Accelerating Voltage |
| --- | --- | --- |
| Less than 2 mm | 0.5 MV or Higher | 0.8 MV or Higher |
| 2 mm to Less than 3 mm | 0.8 MV or Higher | 1 MV or Higher |
| 3 mm to Less than 4 mm | 1.2 MV or Higher | 1.5 MV or Higher |
| 4 to 5 mm | 1.7 MV or Higher | 2 MV or Higher |

When the density of the polymer molded article is 0.8, an accelerating voltage which is 0.8 times a value read from the above Table 1 according to the thickness of the molded article is preferred.

The accelerating voltage preferably does not exceed 3 MV regardless of the density and thickness of the polymer molded article. When the accelerating voltage exceeds 3 MV, degradation of the polymer material in the polymer molded article occurs, and the mechanical properties of the chemical mechanical polishing pad to be obtained may be impaired.

When the sheet-shaped polymer molded article is irradiated with the electron beam, it is preferable to deliver the required irradiation dose in as short a time as possible, e.g. within 2 minutes, preferably within 1 minute, by moving the electron beam back and forth over the molded article. Only one surface or both surfaces of the polymer molded article maybe irradiated with the electron beam. Further, the polymer molded article may be irradiated with the electron beam while rotating around a straight line perpendicular to the surface of the molded article and passing near the center of the molded article. Of these, it is preferable to irradiate all over the polymer molded article with the electron beam while rotating the polymer molded article and moving the electron beam back and forth, from the viewpoints of uniformity of electron beam cross-linking and productivity of the chemical mechanical polishing pad.

In general, the temperature of an object to be irradiated increases when the object is irradiated with an electron beam. In the present invention, the temperature of the sheet-shaped polymer molded article during irradiation of the electron beam is preferably controlled to not higher than 100° C., more preferably controlled to not higher than 80° C., much more preferably controlled to room temperature to 60° C. With this temperature within the above range, thermal deformation of the molded article during irradiation of the electron beam can be prevented advantageously. This temperature control can be implemented by a method comprising cooling a plate that holds the molded article, for example.

The thus obtained electron-beam-irradiated sheet-shaped polymer molded article may be further subjected to thickness adjustment. This thickness adjustment can be made by use of a wide belt sander or the like, for example.

The thus electron-beam-irradiated sheet-shaped polymer molded article is subjected to a tensile test using a No. 3 dumbbell conforming to JIS K 6251, and as a result, the ratio (residual elongation after break) of the total length of broken pieces of the test sample to the overall length of the dumbbell before the test is preferably not higher than 120%, more preferably 101 to 110%. The residual elongation after break of the polymer molded article becomes small by irradiation of the electron beam.

The ratio (E' (30)/E' (90)) of storage elastic modulus at 30° C. (E' (30)) to storage elastic modulus at 90° C. (E' (90)) measured by a temperature dependency test of storage elastic modulus measured by use of "RSAIII" of TA Instruments in a tensile mode at a strain rate of 10 rad/s, a strain of 0.05% and a temperature increasing rate of 5° C./min is preferably 4 to 6. The value of the (E' (30)/E' (90)) becomes small by irradiation of the electron beam.

Shore D hardness measured on the electron-beam-irradiated polymer molded article is preferably not lower than 30, more preferably 30 to 100, much more preferably 40 to 90, particularly preferably 40 to 75. For example, the shore D hardness of an electron-beam-irradiated polymer molded article obtained by irradiating a polymer molded article having a thickness of 2.5 to 3.0 mm and produced from a raw material composition comprising 50 to 99 wt % of 1,2-polybutadiene and 1 to 50 wt % of β-cyclodextrin with an electron beam at an accelerating voltage of 1 to 1.5 MV and an irradiation dose of 25 to 30 kGy for 8 to 10 times is improved by 2 to 10 points from that of the molded article before irradiation of the electron beam.

(3) Step of Forming Grooves on Sheet-Shaped Polymer Molded Article

In the method of the present invention for producing a chemical mechanical polishing pad, a step of forming grooves on the sheet-shaped polymer molded article may be carried out and is preferably carried out after or before the above step (2) of irradiating the molded article with an electron beam. The grooves may be formed on only one surface or both surfaces of the polymer molded article. When the grooves are formed on only one surface of the polymer molded article, the surface having the grooves serves as the polishing surface of the chemical mechanical polishing pad, and when the grooves are formed on both surfaces of the polymer molded article, either of the surfaces may serve as the polishing surface.

When the step of forming the grooves on the sheet-shaped polymer molded article is carried out after the step (2) of irradiating the molded article with an electron beam, it can be carried out by a method of subjecting the electron-beam-irradiated polymer molded article to cutting. Meanwhile, when the step of forming the grooves is carried out before the step (2) of irradiating the molded article with an electron beam, it can be carried out by a method of subjecting the polymer molded article to cutting or a method using a mold having projections that match desired grooves when molding the polymer molded article or a combination of these methods. Of these methods, the cutting method is preferred since the dimensional accuracy of grooves formed is high.

When the step of forming grooves on the sheet-shaped polymer molded article is carried out after the step (2) of irradiating the molded article with an electron beam, shaping of the chemical mechanical polishing pad to be obtained is facilitated, and dimensional accuracy as the polishing pad can be kept high. Meanwhile, when the step of forming grooves is carried out before the step (2) of irradiating the molded article with an electron beam, grooves showing higher slurry retainability at the time of chemical mechanical polishing can be formed. Of these, the groove forming step is preferably carried out after the step of irradiating the molded article with an electron beam, since the chemical mechanical polishing pad requires high dimensional accuracy.

As for the shape of the grooves formed, the width of the groove is preferably 0.5 to 2.0 mm, more preferably 0.5 to 1.8 mm, much more preferably 0.5 to 1.6 mm, particularly preferably 0.5 to 1.4 mm. The pitch of the grooves is preferably 2.0 to 8.0 mm, more preferably 3.0 to 8.0 mm, much more preferably 4.0 to 8.0 mm, particularly preferably 4.0 to 7.0 mm. The depth of the groove is preferably at least 0.1 mm, more preferably 0.1 to 2.5 mm, much more preferably 0.2 to 2.0 mm. By forming such grooves, a chemical mechanical polishing pad that is excellent in removal rate and in-plane uniformity of polish amount on a polished surface can be produced easily.

The surface roughness (Ra) of the inner surface of the groove is preferably not higher than 20 µm, more preferably 0.05 to 15 µm, much more preferably 0.05 to 10 µm. When this surface roughness is not higher than 20 µm, scratches produced on a polished surface in the chemical mechanical polishing step can be prevented more effectively. The above surface roughness (Ra) is defined by the following expression (1).

$$Ra = \Sigma |Z - Z_{av}| / N \quad (1)$$

(In the expression (1), N is the number of measurement points, Z is the height of roughness surface, and $Z_{av}$ is the average height of roughness surface.)

(4) Chemical Mechanical Polishing Pad

The thus obtained electron-beam-irradiated sheet-shaped polymer molded article which preferably has grooves formed thereon can be used as a chemical mechanical polishing pad as it is or can be used as a multilayered pad having a support layer placed on its non-polishing surface (back of the polishing surface).

This support layer is a layer that supports the chemical mechanical polishing pad on the back side of the polishing surface. Although the characteristics of this support layer are not particularly limited, the support layer is preferably softer than the pad body (electron-beam-irradiated polymer molded article). By having the softer support layer, it can be prevented that the pad body is lifted up or the surface of the polishing layer is curved at the time of polishing even if the thickness of the pad body is small, and polishing can be performed stably. The hardness of this support layer is preferably 90% or lower, much more preferably 50 to 90%, particularly preferably 50 to 80%, most preferably 50 to 70% of the shore D hardness of the pad body.

The support layer may be a porous body (foam) or a non-porous body. Further, although its planar shape may be circular, polygonal or the like, for example, it is preferably the same planar shape as that of the polishing pad and has the same size as that of the polishing pad. Its thickness is also not particularly limited but is preferably 0.1 to 5 mm, more preferably 0.5 to 2 mm.

Although a material that constitutes the support layer is not particularly limited, an organic material is preferably used because it can be molded into a given shape and characteristic easily and because it can impart moderate elasticity or the like. As the organic material, the organic materials presented as examples of the material that constitutes the water-insoluble portion of the raw material composition can be used.

(5) Chemical Mechanical Polishing Method

An object to be polished can be chemical-mechanical-polished by use of the chemical mechanical polishing pad produced as described above. This chemical mechanical polishing can be conducted in accordance with a known method except that the chemical mechanical polishing pad produced by the method of the present invention is attached to a commercial chemical polishing apparatus.

Illustrative examples of a material that constitutes a surface to be polished include a metal used as a wiring material, a barrier metal, an insulator, and a material comprising a combination of these. Specific examples of the above metal used as a wiring material include tungsten, aluminum, copper, and an alloy containing at least one of these metals. Specific examples of the above barrier metal include tantalum, tantalum nitride, niobium, and niobium nitride. Specific examples of the above insulator include $SiO_2$, boron phosphorus silicate (BPSG) resulting from adding small amounts of boron and phosphorus to $SiO_2$, an insulator called FSG (Fluorine-Doped Silicate Glass) resulting from doping $SiO_2$ with fluorine, and a silicon-oxide-based insulator having a low dielectric constant. Specific examples of $SiO_2$ include a thermally oxidized film, PETEOS (Plasma Enhanced-TEOS), HDP (High Density Plasma Enhanced-TEOS), and $SiO_2$ obtained by a thermal CVD method.

As an object to be polished to be applied to the chemical mechanical polishing method of the present invention, an object to be polished that comprises copper or a copper-containing alloy, an object to be polished that comprises copper or a copper-containing alloy and an insulator, and an object to be polished that comprises copper or a copper-containing alloy, a barrier metal and an insulator are preferred.

(6) Advantages of Production Method of Chemical Mechanical Polishing Pad of the Present Invention As described above, according to the method of the present invention for producing a chemical mechanical polishing pad, time required for plasticization of the raw material composition is preferably within 2 minutes and time required for cooling and solidification is preferably within 1 minute in the above step (1) of producing the sheet-shaped polymer molded article, and time required for the electron beam irradiation step (2) is preferably within 2 minutes, so that processing time per pad is preferably within only 5 minutes. By the processing, a chemical mechanical polishing pad having a uniform crosslink density can be obtained.

Meanwhile, a chemical mechanical polishing pad described in, for example, Japanese Patent Application Laid-Open No. 8-500622 is generally produced by cutting a an urethane block prepared in advance according to a desired pad shape and size. In this case, since production of the urethane block requires processing at about 150° C. for 1 to 4 hours and cutting for shaping the urethane block into a desired pad shape is also required, pad productivity is not high. Further, since such an urethane block has a variation in composition between its central portion and its peripheral portion, it is difficult to obtain a sheet of uniform composition.

Further, a chemical mechanical polishing pad resulting from thermally cross-linking 1,2-polybutadiene by use of a peroxide and described in Japanese Patent Application Laid-Open No. 2004-327974 is produced by carrying out shaping of the pad and thermal cross-linking of the pad simultaneously by heat pressing at 170 to 180° C. This heat pressing requires 10 to 20 minutes per pad, indicating that pad productivity is not so high.

These two production methods are representative examples of current chemical mechanical polishing pad production. It will be easily understood how easy and productive the method of the present invention is as compared with these methods.

Further, when a chemical mechanical polishing pad produced by the method of the present invention is produced by use of a raw material composition comprising 1,2-polybutadiene and water-soluble particles, the polishing pad has an advantage that it has higher abrasion resistance than, for example, the above polishing pad described in Japanese Patent Application Laid-Open No. 2004-327974 that is produced by thermal cross-linking using a similar raw material composition.

EXAMPLES

Example 1

(1) Production of Sheet-Shaped Polymer Molded Article (1-1) Preparation of Raw Material Composition 72.2 parts by weight of 1,2-polybutadiene (product of JSR Corporation, trade name "JSR RB830") that was a thermoplastic resin as a material for a water-insoluble portion and 27.8 parts by weight of β-cyclodextrin (product of Ensuiko Sugar Refining Co., Ltd., trade name "DEXIPEARL β-100", average particle diameter: 15 μm) as water-soluble particles were kneaded by an extruder adjusted to 160° C. to prepare pellets of the raw material composition.

(1-2) Production of Sheet-Shaped Polymer Molded Article

After the above pellets of the raw material composition were filled in a mold and heated at 150° C. for 1 minute to plasticize them, the temperature inside the mold was lowered to 30° C., and this temperature was kept for 1 minute to cool and solidify the composition. Thereby, a circular sheet-shaped polymer molded article having a diameter of 840 mm and a thickness of 3.5 mm was produced. The volume percent of the β-cyclodextrin in this polymer molded article was 20 vol % based on the total of the 1,2-polybutadiene and the β-cyclodextrin.

(2) Irradiation of Electron Beam

The sheet-shaped polymer molded article obtained above was set in a scanning-type electron beam irradiator (product of NHV Corporation, model: EPS-3000), and with the temperature of the polymer molded article kept at room temperature and under normal pressure, electron beam irradiation was conducted for 8 times, for a total irradiation dose of 200 kGy, at an accelerating voltage of 1 MV and an irradiation dose per irradiation of 25 kGy. Time required for this electron beam irradiation was about 2 minutes. Then, the thickness of the electron-beam-irradiated sheet-shaped polymer molded article was adjusted to 2.5 mm by use of a wide belt sander.

When the shore D hardness of the thus produced electron-beam-irradiated sheet-shaped polymer molded article was measured in accordance with a method conforming to JIS K 6253, it was 64. Further, a No. 3 dumbbell conforming to JIS K 6251 was punched out of the electron-beam-irradiated sheet-shaped polymer molded article, and a tensile test was conducted at a tensile rate of 500 mm/min by use of the dumbbell as a sample to measure tensile strength and residual elongation after break. The tensile strength was 18 MPa. Further, the overall length of the sample before the tensile test was 100 mm, and the total length of broken pieces of the sample was 105 mm, indicating that the residual elongation after break was 105%. Further, when temperature dependency of storage elastic modulus was measured by use of "RSAIII" of TA Instruments in a tensile mode at a strain rate of 10 rad/s, a strain of 0.05% and a temperature increasing rate of 5° C./min, the value (E' (30)/E' (90)) obtained by dividing a storage elastic modulus at 30° C. (E' (30)) by a storage elastic modulus at 90° C. (E' (90)) was 5.3, which was an optimum numerical value as a chemical mechanical polishing pad.

(3) Formation of Grooves

On a surface of the above obtained sheet-shaped polymer molded article having been irradiated with an electron beam, concentric circles having a pitch of 1.5 mm, a width of 0.5 mm and a depth of 1.0 mm were formed by use of a groove forming machine (cutting machine) of Kato Machine Corporate to produce a chemical mechanical polishing pad. When surface roughness of the inner surface of the groove was measured by "1LM21P" of Lasertec Corporation, it was about 2.0 μm.

(4) Chemical Mechanical Polishing Test

On the ungrooved surface of the above obtained sheet-shaped polymer molded article having been irradiated with an electron beam, a double-sided adhesive tape "#422" of Sumitomo 3M Limited was laminated. Then, the molded article was attached to a chemical mechanical polishing apparatus "Reflection" of Applied Materials, Inc. and chemical mechanical polishing was conducted under the following conditions by using a 12-inch patterned wafer (product of SEMATECH Inc., trade name "SEMATECH-754") as an object to be polished.

revolution speed of platen: 120 rpm revolution speed of polishing head: 36 rpm polishing pressure: RP/Zone1/Zone2/Zone3=7.5/6.0/3.0/3.5 [psi]

aqueous dispersion feed rate: 300 ml/min aqueous dispersion for chemical mechanical polishing: CMS7401/CMS7452 (product of JSR Corporation)

polishing time: 1 minute

When the number of scratches on the whole polished surface of the polished wafer was measured by a defect inspection instrument (model "KLA2351") of KLA-Tencor Corporation, it was 0.

Then, polishing was conducted by use of the above polishing apparatus and polishing conditions, using a 12-inch Cu-film-coated wafer (Cu film thickness=1 μm) as an object to be polished. The thickness of the Cu film was measured before and after the chemical mechanical polishing, at 33 points taken evenly in the diametrical direction of the polished surface of the polished object except for 5-mm-wide areas from both ends. From the measurement results, a removal rate and in-plane uniformity of removal thickness were calculated by the following expressions.

removal thickness=film thickness before polishing–film thickness after polishing removal rate=average value of removal thickness/polishing time in-plane uniformity (%)=(standard deviation of removal thickness/average value of removal thickness)×100

Further, when the number of scratches on the whole polished surface of the polished wafer was measured by a SURFSCAN SP1 of KLA-Tencor Corporation, it was 0.

The evaluation results are shown in Table 2.

Example 2

Pellets of a raw material composition were prepared in the same manner as in "(1-1) Preparation of Raw Material Composition" in the above Example 1.

A mold having a cavity having a diameter of 850 mm and a depth of 3.0 mm was adjusted to 40° C., and the above pellets of the raw material composition were injection-molded with a plasticization time of 0.5 minutes by use of an injection molding machine (product of MITSUBISHI HEAVY INDUSTRIES PLASTIC TECHNOLOGY CO., LTD., model "1600MMIIIW") whose cylinder temperature was set at 160° C. Thereby, a sheet-shaped polymer molded article having a diameter of 845 mm and a thickness of 3.2 mm was obtained.

This polymer molded article was subjected to irradiation of electron beam and thickness adjustment under the same conditions as those in Example 1 to obtain an electron-beam-irradiated sheet-shaped polymer molded article having a thickness of 2.5 mm.

When the shore D hardness, tensile strength, residual elongation after break and E' (30)/E' (90) of the thus obtained electron-beam-irradiated polymer molded article were measured in the same manner as in Example 1, the shore D hardness was 63, the tensile strength was 18 MPa, the residual elongation after break was 104% and the E' (30)/E' (90) was 5.1, all of which were optimum numerical values as a chemical mechanical polishing pad.

Then, grooves were formed on a surface of the above electron-beam-irradiated polymer molded article in the same manner as in Example 1 to produce a chemical mechanical polishing pad. When surface roughness of the inner surface of the formed groove was measured in the same manner as in Example 1, it was about 2.3 µm.

By use of the above produced chemical mechanical polishing pad, a Cu-film chemical mechanical polishing test was conducted in the same manner as in Example 1. The results are shown in Table 2.

Example 3

72.2 parts by weight of 1,2-polybutadiene (product of JSR Corporation, trade name "JSR RB830") that was a thermoplastic resin as a material for a water-insoluble portion and 27.8 parts by weight of β-cyclodextrin (product of Ensuiko Sugar Refining Co., Ltd., trade name "DEXPEARL β-100", average particle diameter: 15 µm) as water-soluble particles were charged into an extruder (whose cylinder temperature and T-die temperature were set at 160° C. and 130° C., respectively) having at the front end a T-die having an adjusted gap of 2.8 mm and a width of 900 mm, kneaded with a residence time of 2 minutes, extruded from the T-die and cooled on a roll to obtain a sheet-shaped polymer molded article having a thickness of 3.1 mm. The volume percent of the β-cyclodextrin in this polymer molded article was 20 vol % based on the total of the 1,2-polybutadiene and the β-cyclodextrin.

This polymer molded article was subjected to irradiation of electron beam and thickness adjustment under the same conditions as those in Example 1 to obtain an electron-beam-irradiated sheet-shaped polymer molded article having a thickness of 2.5 mm.

When the shore D hardness, tensile strength, residual elongation after break and E' (30)/E' (90) of this electron-beam-irradiated polymer molded article were measured in the same manner as in Example 1, the shore D hardness was 66, the tensile strength was 17 MPa, the residual elongation after break was 103% and the E' (30)/E' (90) was 5.6, all of which were optimum numeric values as a chemical mechanical polishing pad.

Then, grooves were formed on a surface of the above electron-beam-irradiated polymer molded article in the same manner as in Example 1 to produce a chemical mechanical polishing pad. When surface roughness of the inner surface of the formed groove was measured in the same manner as in Example 1, it was about 2.3 µm.

By use of the above produced chemical mechanical polishing pad, a Cu-film chemical mechanical polishing test was conducted in the same manner as in Example 1. The results are shown in Table 2.

Example 4

The procedure of Example 1 was repeated except that in (1-1) Preparation of Raw Material Composition in Example 1, an ethylene-acrylic acid copolymer (product of DU PONT-MITSUI POLYCHEMICALS CO., LTD., trade name "NUCREL N1560") was used in place of 1,2-polybutadiene as the material for the water-insoluble portion and that in (2) Irradiation of Electron Beam, electron beam irradiation was conducted for 4 times, with an irradiation dose of 25 kGy per irradiation, for a total irradiation dose of 100 kGy. As a result, an electron-beam-irradiated sheet-shaped polymer molded article having a thickness of 2.5 mm was obtained.

When the shore D hardness, tensile strength and residual elongation after break of this electron-beam-irradiated polymer molded article were measured in the same manner as in Example 1, the shore D hardness was 62, the tensile strength was 16 MPa, and the residual elongation after break was 107%.

Then, grooves were formed on a surface of the above electron-beam-irradiated polymer molded article in the same manner as in Example 1 to produce a chemical mechanical polishing pad, and by use of the pad, a Cu-film chemical mechanical polishing test was conducted in the same manner as in Example 1. The results are shown in Table 2.

Examples 5 to 16 and Comparative Examples 1 to 3

The procedure of Example 1 was repeated and various evaluations were made except that the plasticization temperature and the cooling and solidification temperature in (1-2) Production of Sheet-shaped Polymer Molded Article and the number of irradiation in (2) Irradiation of Electron Beam were changed as shown in Table 2.

The irradiation dose per irradiation in (2) Irradiation of Electron Beam was set at 25 kGy in Examples 5 to 16 and Comparative Examples 1 and 3 and at 8 kGy in Comparative Example 2.

The evaluation results are shown in Table 2.

TABLE 2

|  |  | Ex. 1 | Ex. 2 | Ex. 3 | Ex. 4 | Ex. 5 | Ex. 6 | Ex. 7 |
|---|---|---|---|---|---|---|---|---|
| Conditions for Production of Polymer Molded Article | Plasticization Temperature (° C.) | 150 | 150 | 150 | 150 | 150 | 150 | 80 |
|  | Cooling and Solidification Temperature (° C.) | 30 | 30 | 30 | 50 | 50 | 50 | 50 |
| Conditions for Irradiation of Electron Beam | Accelerating Voltage (MV) | 1 | 1 | 1 | 1 | 1 | 1 | 1 |
|  | Irradiation Dose per Irradiation (kGy) | 25 | 25 | 25 | 25 | 25 | 25 | 25 |
|  | Number of Irradiation (times) | 8 | 8 | 8 | 4 | 2 | 16 | 4 |
|  | Total Irradiation Dose (kGy) | 200 | 200 | 200 | 100 | 50 | 400 | 100 |
| Physical Properties of Polymer Molded Article Irradiated with Electron Beam | Shore D Hardness | 64 | 63 | 62 | 62 | 60 | 65 | 61 |
|  | Tensile Strength (MPa) | 18 | 18 | 17 | 16 | 15 | 19 | 19 |
|  | Residual elongation after break (%) | 105 | 104 | 103 | 107 | 110 | 102 | 105 |
| Evaluation Results of Chemical Mechanical Polishing | Removal rate (Å/min), Cu | 8550 | 8400 | 8300 | 8500 | 8500 | 8600 | 8100 |
|  | In-Plane Uniformity (%), Cu | 3.0 | 2.5 | 3.5 | 3.0 | 3.1 | 3.0 | 2.7 |

|  |  | Ex. 8 | Ex. 9 | Ex. 10 | Ex. 11 | Ex. 12 | Ex. 13 | Ex. 14 |
|---|---|---|---|---|---|---|---|---|
| Conditions for Production of Polymer Molded Article | Plasticization Temperature (° C.) | 250 | 150 | 150 | 150 | 150 | 70 | 270 |
|  | Cooling and Solidification Temperature (° C.) | 50 | 10 | 80 | 50 | 50 | 50 | 50 |
| Conditions for Irradiation of Electron Beam | Accelerating Voltage (MV) | 1 | 1 | 1 | 1 | 0.2 | 4 | 1 |
|  | Irradiation Dose per Irradiation (kGy) | 25 | 25 | 25 | 25 | 25 | 25 | 25 |
|  | Number of Irradiation (times) | 4 | 4 | 4 | 4 | 4 | 4 | 4 |
|  | Total Irradiation Dose (kGy) | 100 | 100 | 100 | 100 | 100 | 100 | 100 |
| Physical Properties of Polymer Molded Article Irradiated with Electron Beam | Shore D Hardness | 62 | 62 | 61 | 57 | 50 | 62 | 62 |
|  | Tensile Strength (MPa) | 18 | 19 | 19 | 15 | 9 | 18 | 19 |
|  | Residual elongation after break (%) | 104 | 104 | 105 | 105 | 101 | 105 | 105 |
| Evaluation Results of Chemical Mechanical Polishing | Removal rate (Å/min), Cu | 8530 | 8500 | 8490 | 7800 | 7600 | 7900 | 7600 |
|  | In-Plane Uniformity (%), Cu | 3.1 | 2.4 | 2.9 | 7.0 | 7.0 | 6.0 | 7.0 |

|  |  | Ex. 15 | Ex. 16 | C. Ex. 1 | C. Ex. 2 | C. Ex. 3 |
|---|---|---|---|---|---|---|
| Conditions for Production of Polymer Molded Article | Plasticization Temperature (° C.) | 150 | 150 | 150 | 150 | 150 |
|  | Cooling and Solidification Temperature (° C.) | 5 | 90 | 50 | 50 | 50 |
| Conditions for Irradiation of Electron Beam | Accelerating Voltage (MV) | 1 | 1 | — | 1 | 1 |
|  | Irradiation Dose per Irradiation (kGy) | 25 | 25 | — | 8 | 25 |
|  | Number of Irradiation (times) | 4 | 4 | 0 | 1 | 32 |
|  | Total Irradiation Dose (kGy) | 100 | 100 | 0 | 8 | 800 |
| Physical Properties of Polymer Molded Article after Irradiated with Electron Beam | Shore D Hardness | 60 | 62 | 57 | 57 | 53 |
|  | Tensile Strength (MPa) | 18 | 18 | 15 | 15 | 11 |
|  | Residual elongation after break (%) | 105 | 104 | 150 | 150 | 101 |
| Evaluation Results of Chemical Mechanical Polishing | Removal rate (Å/min), Cu | 7600 | 7800 | 7500 | 7300 | 7100 |
|  | In-Plane Uniformity (%), Cu | 7.0 | 6.0 | 6.3 | 6.5 | 7.0 |

Ex.: Example,
C.Ex.: Comparative Example

Example 17

60 12-inch Cu-film-coated wafers (Cu film thickness=1 μm) were polished successively by use of the above chemical mechanical polishing pad produced in Example 1 under the same conditions as those in Example 1. The transition of removal rate in the successive polishing is shown in Table 3 and FIG. 1.

Comparative Example 4

72.2 parts by weight of 1,2-polybutadiene (product of JSR Corporation, trade name "JSR RB830") and 27.8 parts by weight of β-cyclodextrin (product of Ensuiko Sugar Refining Co., Ltd., trade name "DEXPEARL β-100", average particle diameter: 15 μm) were kneaded by an extruder adjusted to 160° C. to produce pellets A. 100 parts by weight of the pellets A and 0.55 parts by weight of PERCUMYL D-40 (product of NOF CORPORATION) were kneaded by an extruder adjusted to 130° C. to produce pellets B.

The above pellets B were kept in a mold adjusted to 170° C. for 18 minutes and then left to be cooled in the mold until the mold was cooled to room temperature to obtain a disk-shaped molded article having a diameter of 845 mm and a thickness of 3.1 mm. During the molding, a cross-linking reaction by a peroxide occurred. Then, the thickness of this polymer molded article was adjusted to 2.5 mm by use of a wide belt sander.

When the shore D hardness, residual elongation after break and E' (30)/E' (90) of this electron-beam-irradiated polymer molded article were measured in the same manner as in Example 1, the shore D hardness was 65, the residual elongation after break was 104% and the E' (30)/E' (90) was 14.6.

Grooves were formed on a surface of this polymer molded article in the same manner as in Example 1 to produce a chemical mechanical polishing pad.

When chemical mechanical polishing of a 12-inch Cu-film-coated wafer (Cu film thickness=1 μm) was conducted in the same manner as in Example 1 by use of this chemical mechanical polishing pad, the removal rate was 7,100 Å/min and the in-plane uniformity was 7.0%.

Additionally, 59 12-inch Cu-film-coated wafers were polished successively (total number of successively polished wafers: 60). The shift of the removal rate in the successive polishing is shown in Table 3 and FIG. 2.

TABLE 3

| Number of Polished Wafers | Example 17 | Comparative Example 4 |
|---|---|---|
| 5 | 100 | 100 |
| 9 | 97 | 97 |
| 15 | 99 | 96 |
| 25 | 100 | 95 |
| 37 | 101 | 92 |
| 59 | 101 | 91 |

The removal rates in the above Table 3 and FIG. 1 are relative values expressed with the removal rate on the 5$^{th}$ wafer being 100.

As is obvious from the above Table 3 and FIG. 1, in the case of the chemical mechanical polishing pad obtained by the method of the present invention, the removal rate was maintained virtually constant even if the pad polished the objects to be polished successively, while in the case of the chemical mechanical polishing pad of Comparative Example 4 that had been thermally cross-linked by use of a peroxide, the removal rate was gradually decreased as the pad polished the objects to be polished successively.

Figure 2:
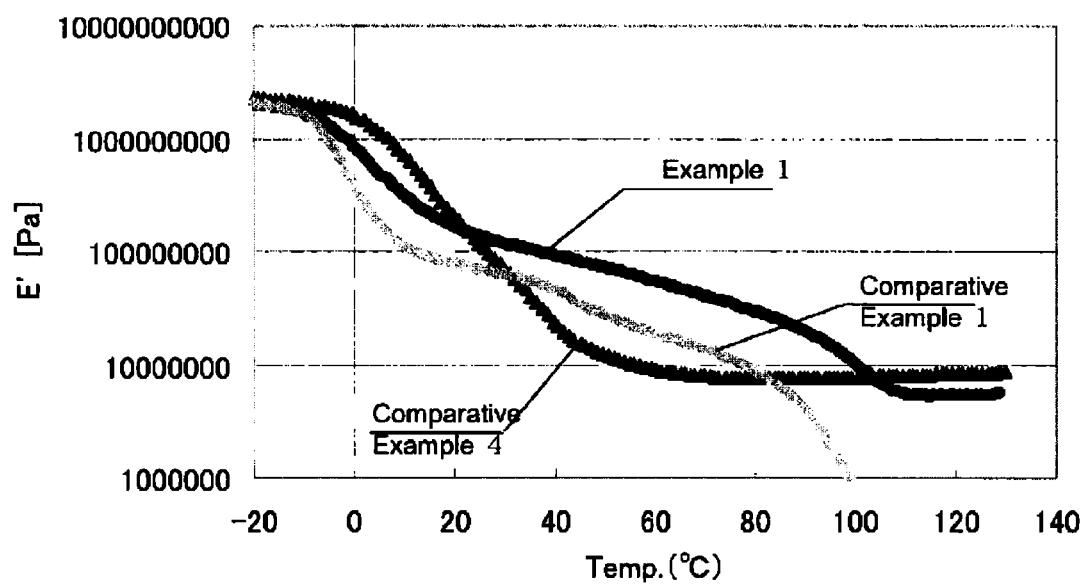
FIG. 2 is a graph showing temperature dependencies of storage elastic moduli measured on electron-beam-irradiated polymer molded articles obtained in Example 1 and Comparative Examples 1 and 4.

FIG. 2 shows a graph of temperature dependencies of storage elastic moduli measured on the above electron-beam-irradiated polymer molded article produced in Example 1 and the above electron-beam-irradiated polymer molded articles obtained in Comparative Examples 1 and 4. These storage elastic moduli are measured.

It is seen from this graph that the electron-beam-irradiated polymer molded article in Example 1 shows a small change in storage elastic modulus from around room temperature to 60° C., as compared with the electron-beam-irradiated polymer molded articles in Comparative Examples 1 and 4.

According to the above Table 3 and FIG. 1, the chemical mechanical polishing pad of Example 17 (i.e. chemical mechanical polishing pad produced in Example 1) shows a stable removal rate as compared with Comparative Example 4. The reason for this is assumed to be as follows. That is, when a number of objects to be polished are polished successively in chemical mechanical polishing, a rise and fall in the temperature of a polishing pad are repeated, and it is assumed that a polishing pad showing a smaller change in storage elastic modulus at that time shows a smaller change in mechanical properties in successive polishing and therefore the removal rate is stabilized for a long time. It has been found for the first time by the present inventors that the effect is produced by a difference in a production method of polishing pad, and it is totally unexpected from the prior art.

Effect of the Invention

As described above, according to the present invention, there is provided a method for producing a chemical mechanical polishing pad, the method being capable of producing a chemical mechanical polishing pad which is excellent in removal rate and scratches and in-plane uniformity on a polished surface and which shows a stable removal rate even when polishing a plurality of objects to be polished, for example 50 or more objects to be polished successively, by a highly productive and simple method.

A chemical mechanical polishing pad produced by the method of the present invention can be suitably used for chemical mechanical polishing of an object to be polished that has a surface to be polished that comprises an insulation film, a wiring material or a barrier metal or a combination of these, for example.

The invention claimed is:

1. A method for producing a chemical mechanical polishing pad, the method comprising:
   (1) producing a sheet-shaped polymer molded article, and
   (2) irradiating the sheet-shaped polymer molded article with an electron beam within an irradiation dose of 10 to 400 kGy wherein the applied voltage of the electron beam in irradiating the molded article with the electron beam is 0.5 to 3 MV.

2. The method of claim 1, wherein the maximum achievable temperature in producing the sheet-shaped polymer molded article does not exceed 250° C., and the temperature of the sheet-shaped polymer molded article in irradiating the molded article with the electron beam is not higher than 100° C.

3. The method of claim 2, wherein the polymer molded article comprises a water-insoluble polymer portion and water-soluble particles dispersed in the portion.

4. The method of claim 3, wherein the water-insoluble polymer portion comprises 1,2-polybutadiene.

5. The method of claim 1, further comprising (3) forming grooves on the sheet-shaped polymer molded article, after (2) irradiating the molded article with the electron beam.

6. The method of claim 1, further comprising (3) forming grooves on the sheet-shaped polymer molded article, before (2) irradiating the molded article with the electron beam.

7. The method of claim 1, wherein the irradiation dose of the electron bean is 75 to 150kGy.

8. A chemical mechanical polishing pad produced by the method of claim 1.

9. A chemical mechanical polishing method comprising chemical-mechanical-polishing an object to be polished by use of the chemical mechanical polishing pad of claim 8.

10. The chemical mechanical polishing method of claim 9, polishing a plurality of objects successively.

11. A chemical mechanical polishing pad produced by the method of claim 7.

12. A chemical mechanical polishing method comprising chemical-mechanical-polishing an object to be polished by use of the chemical mechanical polishing pad of claim 11.

13. The chemical mechanical polishing method of claim 12, polishing a plurality of objects successively.

* * * * *

UNITED STATES PATENT AND TRADEMARK OFFICE
CERTIFICATE OF CORRECTION

PATENT NO.        : 7,790,788 B2
APPLICATION NO.   : 12/253349
DATED             : September 7, 2010
INVENTOR(S)       : Yukio Hosaka et al.

It is certified that error appears in the above-identified patent and that said Letters Patent is hereby corrected as shown below:

On the title page, Item (30), the Foreign Application Priority Data has been omitted. Item (30) should read:

-- (30)        Foreign Application Priority Data

Oct. 18, 2007        (JP) ............................ 2007-271706 --

Signed and Sealed this

Thirtieth Day of November, 2010

David J. Kappos
*Director of the United States Patent and Trademark Office*